2,843,458

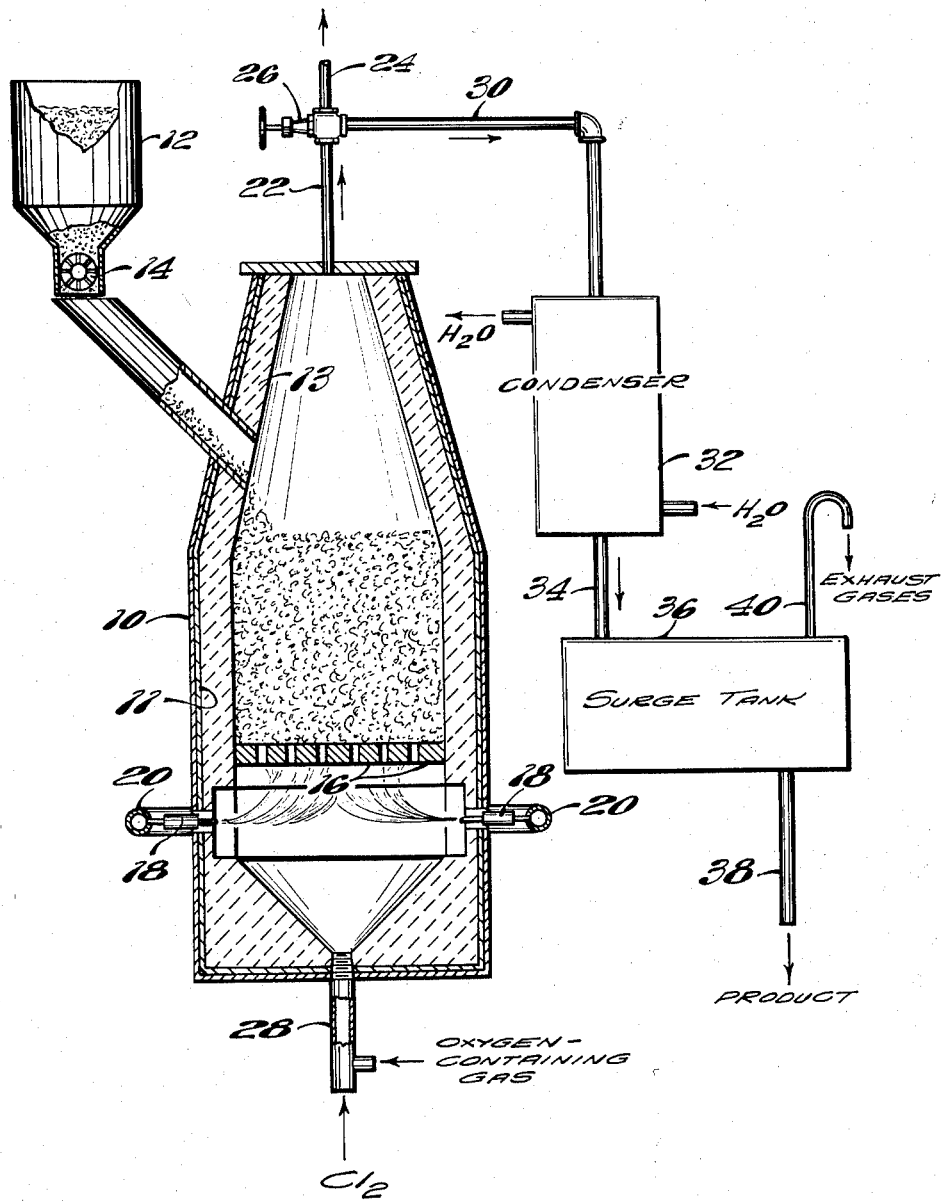

PROCESS FOR PRODUCING SILICON TETRACHLORIDE

Robert D. Beattie, Cambridge, and Laurent P. Michel, Watertown, Mass., and Charles A. Stokes, Houston, Tex., assignors to Godfrey L. Cabot, Inc., Boston, Mass., a corporation of Massachusetts Application October 20, 1955, Serial No. 541,602

11 Claims. (Cl. 23—205)

This invention relates to the production of silicon tetrachloride from firesand or other relatively impure silicon carbide-containing residues. More particularly, it comprises a novel process for chlorinating such residues under conditions such that far more of the silicon carbide content of the residues is converted to silicon tetrachloride than is possible under presently known and practiced processes. Included within the scope of this invention is the novel further step of producing additional amounts of silicon carbide or its reactant equivalent from free silica and carbon in the chlorination zone by means of the reaction heat developed therein.

In conventional practice silicon tetrachloride is ordinarily produced from the cheapest possible grades of silicon carbide, for example, firesand, which ordinarily has a silicon carbide content of around 80–85%, or residues from electric furnace silicon carbide production containing substantial increments of unreacted or incompletely reacted sand and coke. This material in the coarse crushed state, is treated by flowing chlorine gas through an initially preheated bed of the same to form silicon tetrachloride by the reaction, (1) $$SiC + 2Cl_2 \rightarrow SiCl_4 + C$$

which is highly exothermic.

The serious defect common to all prior art processes is the low yield of silicon tetrachloride obtained from each charge, the process necessarily being a batch one. This is largely due to the failure of all the silicon carbide present to react with the chlorine, probably because of deposition of by-product carbon upon the surfaces of the carbide particles. Hence residue amounting to 50–60% of the original charge remains in the reactor when the run has inexorably ended for lack of available reactable silicon carbide. Then the reactor must be shut down, cooled off, cleaned out, recharged and reheated before another batch can be run. While the coated silicon carbide can be regenerated for reuse that step in itself is costly and time consuming.

The principal object of this invention is to provide an improved process for converting silicon carbide to silicon tetrachloride by means of which a larger proportion than heretofore of the silicon carbide charged is converted to product and the percentage of reactor down-time is greatly reduced. A corollary object is, of course, to reduce the amount of solid residue left in the chlorination reactor and thereby to extend the operating time between shut downs for a reactor of a given size.

It is also an object of this invention to reduce significantly the raw material cost of silicon tetrachloride production not only by obtaining more complete utilization of the silicon carbide in the raw material but also by achieving the ultimate chlorination of some of the siliceous material which is present in the initially unreduced state in the charge.

Another object of this invention is to provide a process in which the solid reactant bed is freer from packing and caking difficulties so that the gaseous reactants are more uniformly distributed through the bed with lower pressure drops experienced for given volumes of flow and more uniform and controllable reaction rates and temperatures are attained than heretofore.

Still another object is to supply a composite raw material for the production of silicon tetrachloride which, because of its chemical composition and physical arrangement, can be directly chlorinated readily and substantially completely leaving so little solid residue that a stream of said raw material can be continuously fed to a simple shaft reactor for a considerable period of time as the chlorination reaction proceeds before the reactor must be shut down and cleaned out.

These and other objects and advantages of this invention will be apparent from the detailed description and discussion thereof which follow.

The process of our invention comprises charging to a heat-insulated reaction chamber or furnace a charge material composed of silicon carbide admixed with siliceous and other impurities in the form of finely-ground particles and flowing chlorine admixed with an oxygen-containing gas therethrough. The silicon carbide constituent of the mixture should constitute at least 50% thereof and preferably more since it is the primary source of the silicon constituent of the intended $SiCl_4$ product. However, our invention can be practiced with highly adulterated silicon carbide to permit use of very low cost materials and greatly improve its commercial attractiveness.

The following advantages over prior process thus appear. Instead of charging lumps of adulterated silicon carbide of about 20 mesh to 1 inch in size we utilize finely ground material, i. e., material no larger than about 50 mesh in size and preferably finer than 100 mesh. Hence much more surface is available for reaction. Also, instead of quickly coating the silicon carbide particles with more reactive carbon we remove this carbon as it deposits by oxidation by the oxygen-containing gas. Additionally, instead of treating the siliceous materials as inevitable waste we utilize the heat of reaction and carbon present in the reaction zone to chlorinate the silica and increase ultimate yield of $SiCl_4$.

The reactant charge material is, of course, maintained in the reactor in physical form suited for good contact with the treating gases. When the finely ground material is charged directly to the reactor, it must be fluidized and such operation is perfectly feasible. However, we prefer to employ a static bed, that is, a relatively fixed bed which moves slowly downward as the charge is consumed, for which we first agglomerate the charge. This may be accomplished in any well known manner whereby the finely ground particles are mixed with a small amount of binder, preferably a carbonizable carbohydrate, and agitated or compressed to form spherical pellets, tablets or briquets of substantially uniform shape and size which are, nevertheless, gas permeable.

By preparing the solid feed charge in this manner, its chlorination has been facilitated so much that surprisingly large savings are effected in processing and raw material costs by adjusting the composition of solid and gaseous reactants so that solid carbon in amounts appreciably greater than that initially present in the mixture charged will tend to be converted to gaseous oxides of carbon. The gas composition for this purpose comprises chlorine and, either separately introduced or in admixture therewith, an oxygen-containing gas, e. g., oxygen, air, carbon dioxide, etc., which is selectively reactive under the conditions existing in said chlorination zone with the solid carbon rather than the $SiCl_4$ product. These materials are believed to act in accordance with the following equations:

$$C + \tfrac{1}{2}O_2 \rightarrow CO \qquad (2)$$

$$C + CO_2 \rightarrow 2CO \qquad (3)$$

The effect of adjustments in the solid composition appears to be based on the participation in the chlorination reaction of unreacted silica or other solid oxides in significant amounts, e. g., in accordance with the following equation:

$$SiO_2 + 2C + 2Cl_2 \rightarrow SiCl_4 + 2CO \qquad (4)$$

The preparation of the solid feed charge as an intimate uniform mixture of exceptionally finely ground materials (preferably 100 to 200 mesh powders) appears to be especially important in order to encourage reaction of the $SiO_2$ in the charge in accordance with Equation 4 above. Also, whenever this reaction is being counted on to reduce significantly the amount of solid residue by converting by-product carbon to gaseous oxides, the amount of $SiO_2$ in the charge must, of course, be appreciably in excess of that stoichiometrically required for reaction with the free carbon initially in the solid feed charged. However, in this case, since the raw material should always contain at least about 50% SiC by weight, this means that its free carbon content should never be greater than about 10%, and in most cases not over 5% free carbon by weight will be preferred.

From Equations 1 and 4 above, it can be seen that stoichiometrically 1 mol of $SiO_2$ (60 lbs.) is required for reaction with each 2 mols (24 lbs.) of free carbon or with the by-product carbon from each 2 mols (80 lbs.) of SiC chlorinated. Therefore, the weight percent concentration of $SiO_2$ stoichiometrically required for complete reaction with both the carbon initially present plus that formed as by-product by complete reaction of all the SiC is equal to 2.5 times the weight percent initial free carbon plus 0.75 times the weight percent SiC. Assuming a solid raw material containing 5% initial free carbon and made up only of SiC, $SiO_2$ and C, the weight concentration of $SiO_2$ should be 47.8% and the weight concentration of SiC only 47.2%.

In practice, however, even if such a solids composition were supplied, perfect and complete reaction would not result. In fact, even under best conditions, i. e., when the weight concentration of SiC is well over 50%, seldom can over 80% of the total $SiO_2$ be chlorinated since solid-solid reaction with C is involved. Therefore, for minimum reaction residues and optimum operating efficiency and economy, it is preferable not to rely entirely upon the introduction of excess silica or other solid in the charge for conversion of solid carbon to gaseous oxides. Since $SiO_2$ is much cheaper than firesand or other silicon-carbide rich materials, some $SiO_2$ in excess of that which will react with initial free carbon is desirable. A preferred raw material for this process would, therefore, contain about 10 to 20% by weight excess silica, i. e., the total weight concentration of $SiO_2$ would be not substantially less than about 10+2.5 times the weight percent initial free carbon and not substantially greater than 20+2.5 times the weight percent initial free carbon. Considering both raw material and operating cost, the most outstanding results are obtained in this range of compositions.

Assuming that only 80% of the $SiO_2$ present actually reacts, an expression for the amount of residual carbon (i. e. carbon not consumed by $SiO_2$ reaction) per 100 lbs. of charge if all the SiC does react can be given in terms of the weight percent concentrations of SiC, $SiO_2$ and initial C as follows:

Residual C = initial C + by-product C − C consumed by $SiO_2$, or $$\frac{\text{Mols resid. C}}{100 \text{ lbs. charge}} = \frac{\text{wt. percent init. C}}{12} +$$

The unreacted residue from such a charge can usually be further reduced by the introduction in the reaction gases of some oxygen or $CO_2$ for selective reaction with solid carbon. The amounts of such gases stoichiometrically required for reaction per mol of said residual or excess carbon is immediately indicated by Equations 2 and 3 above. However, since the rate at which the overall reaction proceeds is determined largely by the chlorine feed rate, what is really desired is an expression indicating the approximate ratio of such an auxiliary (selectively reactive) gas to chlorine. This is obtained as follows. From Equations 1 and 4, it is seen that $$\frac{\text{Total mols Cl}_2 \text{ needed}}{100 \text{ lbs. charge}} =$$

$$2\left(\frac{\text{wt. percent SiC}}{40}\right) + 2\left(\frac{0.8 \text{ wt. percent SiO}_2}{60}\right)$$

From this and the previous expression for residual carbon, $$\frac{\text{Mols resid. C}}{\text{Mol Cl}_2} =$$

Therefore, from Equations 2 and 3 above, for stoichiometrically complete consumption of carbon (by-product and initial), the mol ratio of the auxiliary (selectively-reactive) gas to $Cl_2$ is ½ the last expression above for $O_2$ and identical with said expression for $CO_2$.

Considered in connection with the accompanying drawing, which is a diagrammatic view, in vertical partial cross section, of a suitable type of reactor together with related product collection equipment, a preferred embodiment of our invention may be described in more detail as follows:

The reactor 10 may be more or less conventional in construction and includes a metal shell having an intermediate lining 11 of nickel or other heat resistant metal and an inner lining 13 of insulating firebrick, preferably composed largely of silica.

Solid feed material consisting of dry pellets of uniform shape, size and composition made by wet-pelletizing with the aid of a dilute aqueous solution of molasses or other carbohydrate a silicon carbide containing material which had been finely ground and screened through a 100 mesh screen, is delivered from charging hopper 12 through seal valve 14 to the reactor 10. Within the reactor a bed of charge material is formed and supported on grate 16. The initial charge is heated from below by sealed burners 18 supplied with a combustible mixture of gaseous fuel and air from bustle pipe 20.

Combustion products flow up through the bed of pelletized firesand and are conducted away through flue 22 and out stack 24 by appropriate setting of gate 26. When the temperature within the bed of solids has reached about 900–1100° C., heating from burners 18 is discontinued, stack 24 is closed by means of gate 26 and a stream of dry reaction gases substantially free of hydrogen but containing free chlorine is then introduced continuously to the bottom of the bed through pipe 28. The reaction between SiC and chlorine is highly exothermic so that, once the bed is preheated to reaction temperature, the reaction will generally continue as long as both reactants are available. The chlorine flow rate may vary widely but usually at least 30 lbs./hr./sq. ft. of $Cl_2$ will be fed. Assuming it is sufficient to maintain the reaction, the lower the chlorine flow rate, the more complete the conversion of same will tend to be, other things being equal. However, considering both production rate and chlorine utilization efficiency, the optimum chlorine flow rate will generally run between about 30 and 80 lbs./hr./sq. ft. of cross-sectional area of the solid bed. The maximum chlorine flow rate is usually limited by the temperatures generated in the bed. Bed temperatures ranging from about 1000 to about 1600° C. are preferred but zones of 2000° C. or over can be tolerated near the center and some reaction is obtained in zones as low as 800° C.

Once the chlorination reaction has gotten underway, a dry gas such as air, oxygen or $CO_2$, i. e., one which is selectively reactive with solid carbon but inert to $SiCl_4$ is introduced together with the dry, hydrogen-free chlorine stream at the bottom of the reactor. For a given solid feed composition, the stoichiometric amount of such selectively reactive gas per mol of chlorine can be estimated from the relationships given above. The amount of selectively reactive gas should be at least half of the stoichiometric amount thus estimated and may be used somewhat in excess of the said optimum amount. However, best results are usually obtained by using 75 to 100% of the estimated stoichiometric amount.

As the bed of solids is consumed by reaction, additional pelletized raw material is fed either continuously or intermittently from charging hopper 12 through seal valve 14.

The hot reaction product gases containing principally $SiCl_4$ and CO and nitrogen when air is the reactive gas for the solid carbon, are removed continuously through flue 22 and pipe 30 by means of an appropriate setting of gate 26. Also included in the gaseous products are small amounts of unreacted $Cl_2O_2$ and/or $CO_2$ as well as chlorides of iron, aluminum and any other impurity metals in the solid charge which form volatile chlorides. The $SiCl_4$ and other metal chlorides are condensed out in a condenser 32 cooled by water or other suitable liquid coolant. Liquid $SiCl_4$ containing slight amounts of iron and aluminum chlorides is drawn off the bottom of surge tank 36 through pipe 38 while carbon monoxide and any chlorine, nitrogen, oxygen, carbon dioxide and any other permanent gases are exhausted through breather pipe 40. The impure $SiCl_4$ can be readily purified by distillation.

In this manner substantially complete reaction of the SiC in the solid feed is not only obtained but most of the by-product carbon from the SiC chlorination reaction is also converted to gaseous products so that the solid residue which accumulates in reactor 10 is reduced to about 10–15% of the solid matter fed instead of the conventional 50 to 60%. This means that for a given sized reactor, continuous operation can be conducted for about 4 to 5 times longer than conventional processes before it must be shut down and cleaned out. Since the downtime for each stoppage, clean out, recharging and restarting operation would be about the same in each case, say 6 to 12 hours, the proportion of downtime on a given reactor can be reduced several fold in this way.

As we have said, the process of this invention can also be carried out in a fluidized bed. Charge material ground to the sizes previously specified, i. e., to minus 50 mesh but preferably to 150–200 mesh, is fluidized in the reactant gas stream. For such operation, involving somewhat more severe reaction conditions than with the static bed, carbon dioxide is the preferred auxiliary reactant gas because its reaction with carbon is endothermic which helps hold temperatures within bounds. For further temperature control a minor amount of dry inert gas such as nitrogen or carbon monoxide may be introduced with the reactant gases. When employing a fluid bed it is likewise preferred that lining 13 of the reactor be constructed of materials having even higher resistance than silica brick to erosion and chlorine attack, such as refractories based on zirconia, beryllia or alumina.

A better understanding of our invention may be obtained from the following specific examples which are given, however, only for purposes of illustration and not as limitations on the scope of said invention.

*Example 1*

An impure grade of silicon carbide (known as firesand) containing about 80% SiC, 10% $SiO_2$ and 7% C. was micropulverized until 98% passed through 150 mesh screen. The mixture is wet pelletized with additional silica using about 80 parts of dilute molasses solution containing about 5% carbohydrate by weight and the resulting pellets (about ¼″ in average diameter) are dried at 400° to 500° F. to carbonize the organic matter therein. Said pellets are charged to a 2 ft. diameter vertical shaft reactor such as that shown in the attached drawing and heated by natural gas firing to a temperature of about 1000° C. Then a stream of substantially pure chlorine and air is fed at a rate of about 140 lbs./sq. ft./hr. of chlorine and 0.2 lb. mol/sq. ft./hr. based on the oxygen content of the air through a distributor at the bottom of the bed while more sand-firesand pellets are fed from the top at the rate of about 150 lbs./hr. About 85–90% by weight of the solid material fed is converted to gaseous products, chiefly $SiCl_4$ and CO and the reaction is continued for about 75 hours without interruption compared to a maximum uninterrupted operating time of about 12 hours when the same firesand is charged directly after coarse crushing and screening through a 20 mesh screen.

In the above example $SiO_2$ constituted about 40% of the blended and pelletized solid feed charge. While solid feed streams containing larger proportions of $SiO_2$ than this can be used, such surplus $SiO_2$ is not necessary for reaction with by-product carbon and, even if extra free carbon is added together with such surplus $SiO_2$ in the feed charge the percentage conversion of said surplus $SiO_2$ is usually very small. Therefore, feed charges containing over about 45 to 50% $SiO_2$ by weight are not recommended.

*Example 2*

A process is conducted in accordance with the procedures outlined in Example 1 but using a solid feed composition consisting of

| | Percent |
|---|---|
| SiC | 79 |
| $SiO_2$ | 17 |
| C | 4 | and reaction gas containing 0.2 mol of free oxygen per mol of free chlorine. Operation is trouble-free and produces a solid residue of only about 10 to 15% of the material charged permitting uninterrupted continuous runs of several days' duration. The feed rates maintained are about 2750 s. c. f. h. of free chlorine, about 550 s. c. f. h. of free oxygen and about 160 lbs./hr. of solid feed while the production rate amounts to about 450 lbs./hr. of $SiCl_4$ through most of the run.

*Example 3*

Firesand containing about 85% SiC, 9% $SiO_2$ and 4% C is finely ground and a sized fraction between 50 and 150 mesh is fed to a reaction zone lined with high temperature stabilized zirconia refractory and, after being preheated to about 1000 to 1100° C., is suspended therein in the form of a fluidized bed in a dry reaction gas containing about 0.5 mol $CO_2$ per mol of free chlorine. Once the reaction is initiated, additional solid feed is introduced continuously into the reaction gas stream the volume of which is adjusted by controlling the concentration of $N_2$ gas therein in order to maintain a properly fluidized bed.

This fluidized reactor must be shut down and started up again several times as often as a fixed bed reactor of the same size but the down time required for these operations in the fluidized reactor is less than half that for the fixed bed type and the over-all percentage yield of SiCl$_4$ is every bit as good in this case as in Examples 1 and 2.

Having thus described our invention and preferred embodiments thereof, we claim:

1. A process for producing silicon tetrachloride from mixed solid charge materials composed 50–80% of silicon carbide, 3–10% carbon, 17–45% unreduced siliceous matter and the remainder metallic impurities, all percentages being by weight, which comprises subjecting such mixed materials in the form of ultimate particles no larger than about 50 mesh in size and initially preheated to a temperature of at least 900° C. to a stream of chlorine gas and a minor proportion of an oxygen-containing gas, exothermically reacting said solid materials and gases, thereby producing silicon tetrachloride and maintaining reaction temperature, and recovering the silicon tetrachloride thus produced from the other reaction products.

2. The process of claim 1 in which the particles of the mixed materials are reacted in agglomerated condition.

3. The process of claim 1 in which the reaction is carried out in a static bed.

4. The process of claim 1 in which the reaction is carried out in a fluid bed fluidized by means of the reactant gases.

5. The process of claim 1 in which the oxygen-containing gas is selectively reactive with solid carbon.

6. The process of claim 5 in which the oxygen-containing gas is selected from the group consisting of oxygen, air, carbon dioxide and mixtures thereof.

7. The process of claim 1 further characterized by providing unreduced siliceous matter in the reactant charge material in an amount in excess of that required for theoretically complete reaction with all of the free carbon therein.

8. A process for producing silicon tetrachloride from firesand and similar impure silicon carbide compositions which comprises delivering to a heat-insulated reaction zone a mixture of finely-divided solids containing no primary particles larger than about 50 mesh in size composed of 50–80% by weight silicon carbide, 3–10% by weight carbon, 17–45% by weight unreduced siliceous matter and the remainder metallic compounds, initially heating said solids to at least 900° C., flowing chlorine gas and a minor proportion of an oxygen-containing gas in contact with said solids, exothermically reacting the gases with the silicon carbide, thereby converting the silicon carbide to silicon tetrachloride and separating off the carbon formed on the surfaces of the particles by the chlorination reaction while providing heat to maintain said reaction and to effect reaction between the unreduced siliceous matter and free carbon and chlorine; simultaneously chlorinating the unreduced siliceous matter in the presence of free carbon to silicon tetrachloride, and recovering the silicon tetrachloride thereby formed from said zone and from the other reaction products.

9. The process of claim 8 in which the solids mixture is in the form of agglomerates bound together by means of a carbonized carbohydrate.

10. The process of claim 8 in which the oxygen-containing gas is selected from the group consisting of oxygen, air, carbon dioxide and mixtures thereof and is present in an amount in molar ratio of oxygen to chlorine equal to at least half of the stoichiometric amount as estimated from the composition of the solids mixture feed.

11. The process of claim 8 in which the amount of oxygen-containing gas employed in the reaction is between 50 and 125% of the amount stoichiometrically required for complete reaction with all of the free carbon present in the reaction zone not theoretically consumed by reaction with 80% of the available siliceous matter.

References Cited in the file of this patent

UNITED STATES PATENTS

| 2,425,504 | Belchetz | Aug. 12, 1947 |
| 2,739,041 | Andersen | Mar. 20, 1956 |

FOREIGN PATENTS

| 375,713 | Germany | May 15, 1923 |
| 75,041 | Norway | May 9, 1949 |